June 26, 1923.
E. C. HANDSCHUG
PATCH FOR TIRES
Filed Feb. 28, 1921
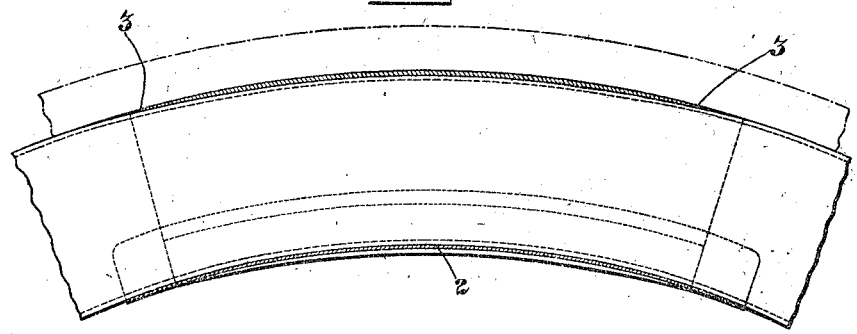
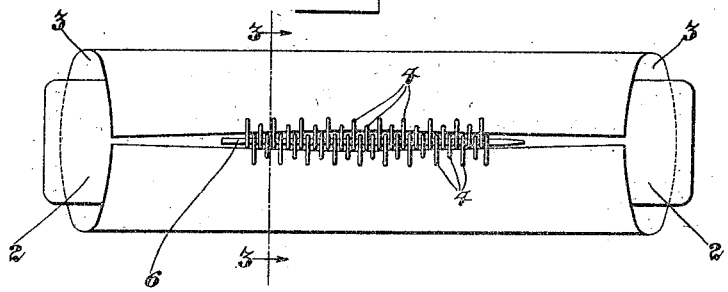
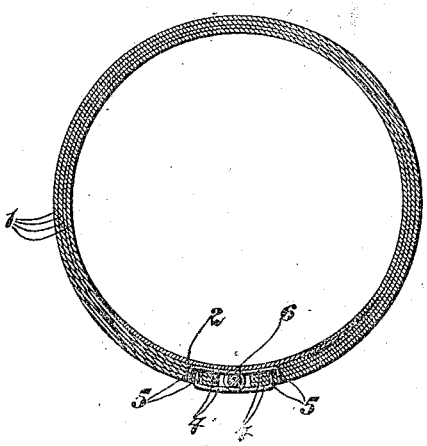
Inventor.
Earl C. Handschug,
by Rippey & Kingsland,
His Attorneys.

Patented June 26, 1923.

1,459,887

UNITED STATES PATENT OFFICE.

EARL C. HANDSCHUG, OF ST. LOUIS, MISSOURI.

PATCH FOR TIRES.

Application filed February 28, 1921. Serial No. 448,289.

*To all whom it may concern:*

Be it known that I, EARL C. HANDSCHUG, a citizen of the United States, residing at the city of St. Louis and State of Missouri, have invented a new and useful Patch for Tires, of which the following is a specification.

This invention relates to inside patches for tires.

An object of the invention is to provide a novel and improved inside patch for tires adapted to be placed within the tire casing to strengthen and protect the inner tube, even though the casing be damaged by blow-out, rim cuts, stone bruises, nail punctures, or otherwise becomes cut or perforated, thereby making it possible to continue the use of the damaged casing in actual service.

Another object of the invention is to provide an inside tire patch of the character and for the purpose mentioned which will not slip from its position on the inner tube, or in the tire casing, and which eliminates all friction when the tire is properly inflated.

Another object of the invention is to provide an improved tire patch of the character and for the purpose mentioned with novel equipment for lacing the patch around the inner tube, the entire structure of the patch being such that it will not damage the inner tube or the casing even though continued in use until the tire is worn out.

Another object of the invention is to provide an improved inside tire patch of the character and for the purpose mentioned with a permanently flexible and pliable lacing connection for holding the patch around the inner tube.

Another object of the invention is to provide a novel and improved inside tire patch which is characterized by the fact and condition that there are no metallic parts or elements to contact with or injure the inner tube of the tire.

Other objects and advantages obtained by my improved inside tire patch will appear from the following description in which reference is made to the drawing, showing features of the invention and in which—

Fig. 1 is a sectional view of the tire patch upon an inner tube within a tire casing, the lacing devices being omitted to avoid confusion of lines in the drawing.

Fig. 2 is an elevation showing the preferred construction of my improved lacing for the tire patch.

Fig. 3 is a sectional view on the line 3—3 of Fig. 2.

As shown, my improved tire patch comprises an arcuate sleeve, the curvature of which substantially conforms to the curvature of the tube and of the inner side of the tire casing with which it is intended to be used. The sleeve may be of any desired length and made of a laminated construction comprising two or more layers of flexible and pliable material secured together by vulcanizing, or by the use of appropriate cement, or otherwise. As shown in Fig. 3, the patch is composed of four layers 1 of fabricated material appropriately bonded together, but it will be understood that I do not restrict myself to the use of any specific number of layers.

The sleeve is open along one side and a flap 2 is arranged to extend across and bridge the opening between the adjacent laced edges of the sleeve so as to prevent injury to the inner tube. One edge of the flap 2 is vulcanized, or cemented, or otherwise firmly secured between the first and second plies or layers 1, and has its other edge free or separate from the patch. As shown the flap extends across the opening or space between the edges of the sleeve and lies against the inner surface of the sleeve forming a smooth inner surface and preventing the lacing elements from contacting with the inner tube. The free side edge of the flap 2 is attenuated so that no abrupt step or off-set exists that might be injurious to the inner tube of the tire. So, also, the edge of the inner ply or layer of the sleeve under which one edge of the flap 2 is secured, is attenuated. Similarly, the ends of the sleeve patch run together gradually thinning, or attenuated extremities 3, thus enabling the ends of the sleeve patch to shape themselves properly so that no damage will be caused to the tube on which the patch is mounted.

Preferably, the flap 2 is of greater length than the sleeve so as to afford proper protection for the inner tube at the ends of the sleeve by preventing the tube from being pinched between the side edges of the tire, or otherwise injured.

My improved lacing comprises a series of separate wire loops secured to the adjacent edges of the sleeve. The arms 4 of each loop are preferably of different lengths as clearly shown in Fig. 2. The edge portions of the sleeve are embraced between the arms 4 of the loops, and the extremities 5 of the loops are bent at right angles to the arms and imbedded in the sleeve material, but do not extend entirely through the sleeve material as protruding ends would be detrimental. The series of loops are arranged to overlap, as shown, the loops of each series extending between the loops of adjacent series in alternate relation as shown in Fig. 2. Preferably the loops are arranged so that the long arms and the short arms thereof are on alternately opposite sides of the material, in order to avoid weakening of the material along its marginal edge. A small rod 6 is provided and may be threaded or passed through the overlapping loops as shown to bind the sleeve around the inner tube. Preferably the rod 6 is of some flexible non-metallic material such as raw hide, which possesses the characteristic of pliability so that it will readily conform to the shape of the tire and yield to pressure without injuring any of the contacting parts.

My improved patch may be applied by placing it around a partially inflated inner tube at the proper position to cover or extend across the damaged part of the tire casing. The tire may then be mounted on the wheel and inflated. When the tire is properly inflated the tube will not slip from its proper adjustment and all of the metallic parts of the patch, comprising the fasteners 4 are prevented from coming in contact with the tube.

Patches of this character may be made satisfactorily of fabric carcasses, or of fabric cord carcasses. The thickness of the patch in such cases depends upon the thickness of the carcasses used, since different tires are made of different thickness. The patch possesses the characteristic of complete flexibility and pliability, with perfectly smooth inner surfaces so as to cause no injury by abrasion or by pressure to the inner tube.

I do not restrict myself to unessential particulars, since the construction and arrangement may be varied without departing from the principle of the invention.

The invention completely serves all of its intended objects and purposes, and is very durable and of comparatively inexpensive construction.

What I claim and desire to secure by Letters Patent is:—

An inside tire patch, comprising a split sleeve composed of layers of fabricated material bonded together and having their edges in radial alinement, a series of separate loops secured to the sleeve at each side of the split, a non-metallic pliable rod passing through all of said loops between the edges of the sleeve to bind the sleeve around an inner tube, and a flap having one edge overlapped by one of the layers of the sleeve at one side of the split beyond the ends of the series of loops at that side of the split, said flap extending across the split beyond the opposite ends of the loops at the opposite side of the split, and said flap extending beyond each end of the sleeve.

EARL C. HANDSCHUG.